US010929551B2

(12) United States Patent
Mao et al.

(10) Patent No.: US 10,929,551 B2
(45) Date of Patent: Feb. 23, 2021

(54) METHODS AND SYSTEMS FOR MANAGING DATA ASSETS

(71) Applicant: Comcast Cable Communications, LLC, Philadelphia, PA (US)

(72) Inventors: Weidong Mao, West Windsor, NJ (US); Elad Nafshi, Bryn Mawr, PA (US); Mark Andrew Vickers, Marina del Rey, CA (US); Gregory Allen Broome, Broomfield, CO (US); Sree Kotay, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 13/799,964

(22) Filed: Mar. 13, 2013

(65) Prior Publication Data

US 2014/0283120 A1 Sep. 18, 2014

(51) Int. Cl.
*G06F 21/06* (2006.01)
*G06F 21/62* (2013.01)
*H04L 29/06* (2006.01)

(52) U.S. Cl.
CPC .......... *G06F 21/6218* (2013.01); *H04L 63/10* (2013.01); *H04L 63/107* (2013.01); *H04L 2463/101* (2013.01)

(58) Field of Classification Search
CPC ..... H04L 63/102; H04L 63/10; H04L 63/107; G06F 21/10; G06F 21/31; G06F 21/6218
USPC .......................................................... 726/28
See application file for complete search history.

(56) References Cited

U.S. PATENT DOCUMENTS

| 4,839,640 | A | * | 6/1989 | Ozer | G07C 9/00103 235/382 |
|---|---|---|---|---|---|
| 5,905,522 | A | * | 5/1999 | Lawler | H04N 7/17309 348/E7.07 |
| 6,008,847 | A | * | 12/1999 | Bauchspies | H03M 7/42 375/240.01 |
| 6,314,425 | B1 | * | 11/2001 | Serbinis et al. | |
| 6,335,927 | B1 | * | 1/2002 | Elliott | H04L 12/14 370/352 |

(Continued)

FOREIGN PATENT DOCUMENTS

| CA | 2845988 A1 | 9/2014 |
|---|---|---|
| EP | 2779573 A2 | 9/2014 |

(Continued)

OTHER PUBLICATIONS

Partial Search Report dated Jun. 24, 2014, by the European Patent Office for application EP14159563.7, filed on Mar. 13, 2014, and published as EP2779573 on Sep. 17, 2014, (Inventor—Mao // Applicant—Comcast Corp.) (6 pages).

(Continued)

*Primary Examiner* — Shahriar Zarrineh
(74) *Attorney, Agent, or Firm* — Ballard Spahr LLP (57) ABSTRACT

Methods and systems for managing data assets and rights thereto are disclosed. One method can include generating an access token representing access rights of one or more users or device. A request for access to data can be received from the one or more users and the request can be granted or denied based upon the access rights of the one or more users. The access token can be modified based upon granting or denying the request.

20 Claims, 7 Drawing Sheets

(56) References Cited

U.S. PATENT DOCUMENTS

| | | | | |
|---|---|---|---|---|
| 6,357,010 B1* | 3/2002 | Viets | G06F 21/6218 | 709/225 |
| 6,662,230 B1* | 12/2003 | Eichstaedt | G06F 21/62 | 709/217 |
| 6,785,423 B1* | 8/2004 | Joshi | H04N 19/70 | 375/E7.048 |
| 6,968,385 B1* | 11/2005 | Gilbert | G06F 21/6218 | 709/229 |
| 7,315,946 B1* | 1/2008 | Blumenfeld | G06F 21/10 | 726/31 |
| 7,353,339 B2* | 4/2008 | Komarla | G06F 12/0862 | 711/133 |
| 7,631,362 B2* | 12/2009 | Ramsey | G06F 21/316 | 726/27 |
| 7,721,339 B2* | 5/2010 | Madison et al. | | 726/27 |
| 8,051,491 B1* | 11/2011 | Cavage | G06F 21/6218 | 707/609 |
| 8,234,302 B1* | 7/2012 | Goodwin | G06F 21/10 | 707/783 |
| 8,453,058 B1* | 5/2013 | Coccaro | G06Q 10/103 | 705/319 |
| 8,463,815 B1* | 6/2013 | Zoellner | | 707/783 |
| 8,478,693 B1* | 7/2013 | Weigle | G06F 21/10 | 705/51 |
| 8,554,809 B1* | 10/2013 | Zhou | G06F 7/00 | 707/821 |
| 8,689,293 B2* | 4/2014 | Iida et al. | | 726/4 |
| 8,819,851 B1* | 8/2014 | Johansson | | 726/28 |
| 8,856,865 B1* | 10/2014 | Martini | H04L 63/20 | 709/223 |
| 8,918,306 B2* | 12/2014 | Cashman | H04L 63/08 | 703/2 |
| 9,324,375 B1* | 4/2016 | Casalena | H04L 65/80 | |
| 9,400,875 B1* | 7/2016 | Barraclough | G06F 21/10 | |
| 10,404,772 B2* | 9/2019 | Lee | H04L 67/02 | |
| 2002/0019814 A1* | 2/2002 | Ganesan | G06F 21/10 | 705/59 |
| 2002/0091947 A1* | 7/2002 | Nakamura | | 713/202 |
| 2003/0145236 A1* | 7/2003 | Tateoka | H04L 63/1408 | 726/12 |
| 2004/0111645 A1* | 6/2004 | Baffes | H04L 63/0815 | 726/8 |
| 2004/0187029 A1* | 9/2004 | Ting | | 713/201 |
| 2005/0080967 A1* | 4/2005 | Ries | G06F 13/364 | 710/240 |
| 2005/0108423 A1* | 5/2005 | Centemeri | | 709/237 |
| 2006/0117233 A1* | 6/2006 | Cowell | G11C 29/022 | 714/724 |
| 2006/0232449 A1 | 10/2006 | Jain et al. | | |
| 2006/0272031 A1* | 11/2006 | Ache | G06F 21/10 | 726/28 |
| 2007/0078983 A1* | 4/2007 | Modrall | G06F 21/62 | 709/226 |
| 2007/0136315 A1* | 6/2007 | Choi | H04L 67/1076 | |
| 2007/0168294 A1 | 7/2007 | Tsurukawa | | |
| 2007/0282855 A1* | 12/2007 | Chen et al. | | 707/10 |
| 2007/0286161 A1* | 12/2007 | Croak | H04L 65/1069 | 370/352 |
| 2007/0286397 A1* | 12/2007 | Hublet | H04L 5/1438 | 379/350 |
| 2007/0294447 A1* | 12/2007 | Nozaki | G06F 13/1642 | 710/240 |
| 2008/0168135 A1* | 7/2008 | Redlich | G06Q 10/10 | 709/204 |
| 2010/0313239 A1* | 12/2010 | Chakra | G06F 21/6218 | 726/2 |
| 2010/0328528 A1* | 12/2010 | Eggert | H04N 21/2343 | 348/425.2 |
| 2011/0013501 A1* | 1/2011 | Curtis | | 369/100 |
| 2011/0025532 A1* | 2/2011 | Markram | H04L 25/493 | 341/61 |
| 2011/0058675 A1* | 3/2011 | Brueck | H04N 21/8355 | 380/277 |
| 2011/0167256 A1* | 7/2011 | Lee et al. | | 713/156 |
| 2011/0219425 A1* | 9/2011 | Xiong | G06F 21/00 | 726/1 |
| 2012/0005729 A1* | 1/2012 | Amitai | H04L 63/102 | 726/4 |
| 2012/0041829 A1* | 2/2012 | Rothschild et al. | | 705/26.1 |
| 2012/0117225 A1* | 5/2012 | Kordasiewicz | H04L 65/1083 | 709/224 |
| 2012/0191909 A1* | 7/2012 | Huang | H04L 67/1002 | 711/112 |
| 2012/0246483 A1* | 9/2012 | Raisch | H04L 9/3297 | 713/178 |
| 2012/0246738 A1* | 9/2012 | Shah et al. | | 726/28 |
| 2013/0013799 A1* | 1/2013 | Keum | H04L 67/02 | 709/231 |
| 2013/0014278 A1* | 1/2013 | Jin | G06F 19/322 | 726/28 |
| 2013/0042015 A1* | 2/2013 | Begen | H04N 21/6125 | 709/231 |
| 2013/0047248 A1* | 2/2013 | Radhakrishnan | H04L 63/08 | 726/11 |
| 2013/0086631 A1* | 4/2013 | Archer | H04L 65/605 | 726/1 |
| 2013/0091248 A1* | 4/2013 | Viswanathan | H04W 72/1236 | 709/219 |
| 2013/0152221 A1* | 6/2013 | Yin | G06F 21/10 | 726/31 |
| 2013/0160144 A1* | 6/2013 | Mok | H04W 12/06 | 726/29 |
| 2014/0020080 A1* | 1/2014 | Antypas, III | G06F 21/6218 | 726/9 |
| 2014/0032849 A1* | 1/2014 | De Vleeschauwer | G06F 12/0862 | 711/133 |
| 2014/0089467 A1* | 3/2014 | Beck | H04L 65/605 | 709/219 |
| 2014/0108495 A1* | 4/2014 | Benno | H04N 21/8456 | 709/203 |
| 2014/0130181 A1* | 5/2014 | Baks | G06F 21/10 | 726/27 |
| 2014/0189127 A1* | 7/2014 | Chagam | H04L 47/72 | 709/226 |
| 2014/0317234 A1* | 10/2014 | Mueller | H04L 67/02 | 709/217 |
| 2015/0302033 A1* | 10/2015 | Jarnikov | H04L 65/4084 | 707/695 |

FOREIGN PATENT DOCUMENTS

| WO | WO-2007/058439 A1 | 5/2007 |
|---|---|---|
| WO | WO-2011/140288 A1 | 11/2011 |

OTHER PUBLICATIONS

Extended Search Report dated Nov. 10, 2014, by the European Patent Office for application EP14159563.7, filed on Mar. 13, 2014, and published as EP2779573 on Sep. 17, 2014, (Inventor—Mao // Applicant—Comcast Corp.) (9 pages).

OMA Open Mobile Alliance: "DRM Architecture Approved Version 2.0—Mar. 3, 2006 Open Mobile Alliance OMA-AD-DRM-V2 0-20060303-A". Available at: http://www.openmobilealliance.org/release_program/docs/DRM/V2_0-20060303-A.pdf (24 pages).

OMA Open Mobile Alliance: "DRM Rights Expression Language—Approved Version 2.1—Oct. 14, 2008—OMA-TS-DRM-REL-V2_1-20081014-A" Available at: http://www.openmobilealliance.org/Technical/release_program/docs/DRM/V2_1-20100406-A/OMA-TS-DRM_REL-V2_1-20081014-A.pdf (67 pages).

Hilty, et al., "A Policy Language for Distributed Usage Control"; Sep. 24, 2007. Computer Security, 2007, Lecture Notes in Computer Science, Springer, Berlin (pp. 531-546).

Canadian Office Action dated Apr. 17, 2020 by the Canadian Intellectual Property Office for CA Application No. 2,845,898, filed

(56) References Cited

OTHER PUBLICATIONS on Mar. 13, 2014 (Applicant-Comcast Cable Communications, LLC.) (8 Pages).

Muhlbauer, et al.: "Location constraints in digital rights management", Computer Communications, vol. 31, No. 6, pp. 1173-1180, (2008).

* cited by examiner

METHODS AND SYSTEMS FOR MANAGING DATA ASSETS

BACKGROUND

Traditional content protection systems such as digital rights management (DRM) systems typically only manage access to network-based content. Such DRM systems are not configured to manage access policies associated with content such as sync-and-go content or hybrid network/sync-and-go content. For example, a license can be granted for a particular content asset that allows a licensee to access the content asset. However, current licenses do not provide granular options for selectively and dynamically managing discrete rights and/or rights related policies associated with the content asset. This disclosure addresses such and other shortcomings related to control of content delivery.

SUMMARY

It is to be understood that both the following summary and the following detailed description are exemplary and explanatory only and are not restrictive, as claimed. Provided are methods and systems for, in one aspect, managing data assets such as content presented to one or more devices or users. Provided are methods and systems, in another aspect, for unified content access for combined network assets and downloaded sync and go assets. Sync and go assets can comprise data assets that can be downloaded to a network connected device and then presented via the device while the device is no longer connected to the network. In a further aspect, content access can be based upon one or more properties related to both requested content and requesting devices/users.

In an aspect, methods can comprise generating an access token (e.g., data tuple, record, object, etc.) representing access rights of one or more users and/or devices. Access rights can comprise user or device rights relating to any interaction with data such as content. Interactions can comprise download, transmission, upload, sharing, rendering, modifying, copying, storing, and the like. Access rights can be provided based on particular content assets, types of content assets, type of access, geo-location of user or device, class of user or device, and other criteria. A request for access to data can be received from the one or more users and/or devices. The request can be granted or denied based upon the access rights of the one or more users. The access token can be modified based upon granting the request.

In another aspect, methods can comprise generating an access token representing access rights associated with a data asset and one or more devices. A request for access to data can be received from the one or more users and/or devices. The request can be granted or denied based upon the access rights associated with the data asset and the one or more devices. The access token can be modified based upon granting the request.

In a further aspect, methods can comprise generating an access token representing access rights of one or more users or device. A number of access requests granted to the one or more users and/or devices can be determined. The access token can be modified based upon the number of access requests. If the number of access requests exceeds an access threshold, one or more subsequent access requests can be denied.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

In order to manage and deliver large data files in a streaming environment, streaming technologies that involve an adaptive data stream can divide the data stream into smaller video fragments that are, for example, a few seconds long. The fragments can then be arranged sequentially to form a video in the streaming client. The fragments can be of varying video quality and there can be multiple fragments corresponding to a single portion of a stream, each at different levels of quality. In an aspect, adaptive streaming systems, according to the present disclosure, can adapt to network and client changes by loading successive fragments in a higher or lower quality, as needed. In an aspect, access to such fragments can be managed (e.g., policed, governed, implemented, tracked, etc.) by the systems and methods of the present disclosure. In a further aspect, methods can comprise generating an access token (e.g., data tuple, record, object, etc.) representing access rights of one or more users and/or devices. As such, access policies, rules, and the like relating to one or more data assets can be implemented using the access token to track specific interactions (e.g., download, transmission, upload, sharing, rendering, modifying, copying, storing, and the like) with the data asset, rather than just a binary policy of access/no access.

Disclosed are components that can be used to perform the disclosed methods and comprise the disclosed systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, solid state device, flash memory, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Provided are methods and systems for, in one aspect, managing data assets, such as content presented to one or more devices or users. Provided are methods and systems, in another aspect, for unified content access for combined network assets and downloaded sync and go assets. Network assets can comprise data stored and/or accessed over a network, such as cloud-based storage, remote storage, network recordings, and shared content via a network. Sync and go assets can comprise data assets that can be downloaded to a network connected device and then presented via the device while the device is no longer connected to the network. In a further aspect, content access can be based upon one or more properties related to both requested content and requesting devices/users. In a further aspect, methods can comprise generating an access token (e.g., data tuple, record, object, etc.) representing access rights of one or more users and/or devices. Access rights can comprise user or device rights relating to any interaction with data, such as content. Interactions can comprise download, transmission, upload, sharing, rendering, modifying, copying, storing, and the like. Access rights can be provided based on particular content assets, types of content assets, type of access, geo-location of user or device, class of user or device, and other criteria.

Figure 1:
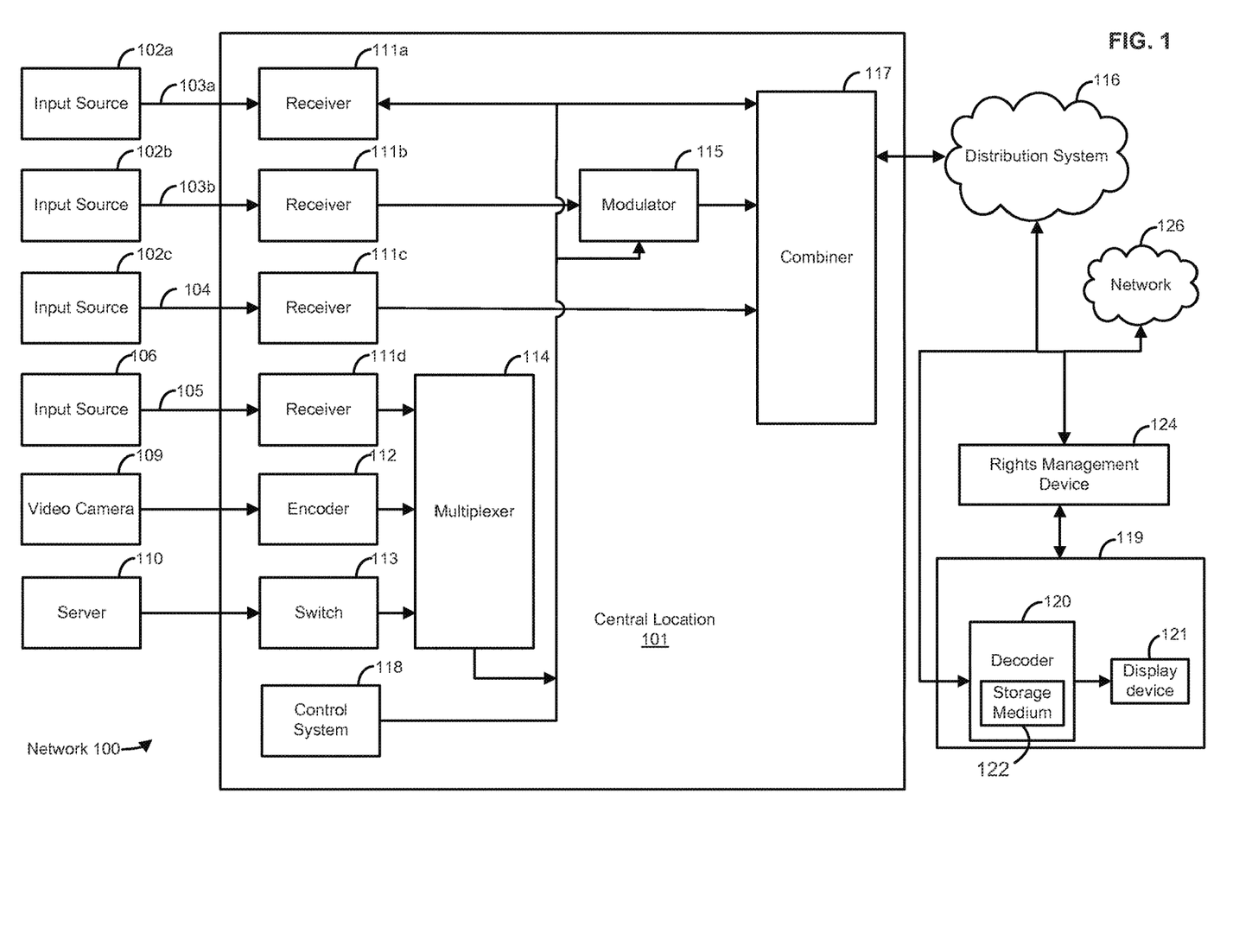
FIG. 1 is a block diagram of an example network.

FIG. 1 illustrates various aspects of an example network environment in which the present methods and systems can operate. Some aspects of the present disclosure relate to methods and systems for content control. Those skilled in the art will appreciate that present methods may be used in systems that employ both digital and analog equipment. One skilled in the art will appreciate that provided herein is a functional description and that the respective functions can be performed by software, hardware, or a combination of software and hardware.

The network 100 can comprise a central location 101 (e.g., a control or processing facility in a fiber optic network, wireless network or satellite network, a hybrid-fiber coaxial (HFC) content distribution center, a processing center, head-end, etc.), which can receive content (e.g., data, input programming) from multiple sources. The central location 101 can combine the content from the various sources and can distribute the content to user locations, such as location 119, via distribution system 116.

In an aspect, the central location 101 can receive content from a variety of sources 102a, 102b, 102c. The content can be transmitted from the source to the central location 101 via a variety of transmission paths, including wireless (e.g. satellite paths 103a, 103b) and terrestrial path 104. The central location 101 can also receive content from a direct feed source 106 via a direct line 105. Content can also be created at the central location 101. Other input sources can comprise capture devices such as a video camera 109 or a server 110. The signals provided by the content sources can comprise a single content item or a multiplex that comprises several content items.

The central location 101 can comprise one or a plurality of receivers 111a, 111b, 111c, 111d that are each associated with an input source. For example, MPEG encoders such as encoder 112, are included for encoding/transcoding local content or a video camera 109 feed. As a further example, a data packaging device, such as a fragmentor, can be integrated with the encoder 112 (or separate and in communication with the encoder 112) to package the encoded/transcoded content. In an aspect, the encoder 112 and/or fragmentor can repeatedly embed markers, flags, and signals into the content data stream for processing by downstream devices. A switch 113 can provide access to server 110, which can be, for example, a pay-per-view server, a data server, an internet router, a network system, and/or a phone system. Some signals may require additional processing, such as signal multiplexing, prior to being modulated. Such multiplexing can be performed by multiplexer (mux) 114.

The central location 101 can comprise one or a plurality of modulators 115 for interfacing to the distribution system 116. The modulators can convert the received content into a modulated output signal suitable for transmission over the distribution system 116. The output signals from the modulators can be combined, using equipment such as a combiner 117, for input into the distribution system 116.

A control system 118 can permit a system operator to control and monitor the functions and performance of network 100. The control system 118 can interface, monitor, and/or control a variety of functions, including, but not limited to, the channel lineup for the television system, billing for each user, and/or conditional access for content distributed to users. Control system 118 can provide input to the modulators for setting operating parameters, such as system specific MPEG table packet organization or conditional access information. The control system 118 can be located at central location 101 or at a remote location.

The distribution system 116 can distribute signals from the central location 101 to user locations, such as user location 119. The distribution system 116 can be an optical fiber network, a coaxial cable network, a hybrid fiber-coaxial network, a wireless network, a satellite system, a direct broadcast system, or any combination thereof. There can be a multitude of user locations connected to distribution system 116. At user location 119, a decoder 120, such as a gateway or communications terminal (CT) can decode, if needed, the signals for display on a display device, such as on a display device 121 such as a television set (TV), a mobile device, or a computer monitor. Those skilled in the art will appreciate that the signal can be decoded in a variety of equipment, including a CT, a computer, a TV, a monitor, or satellite dish. In an aspect, the methods and systems disclosed can be located within, or performed on, one or more CT's, display devices 121, central locations 101, DVR's, home theater PC's, and the like. As an example, the decoder 120 can receive and process embedded markers, flags, and signals in the content data stream for controlling a content received by the decoder 120.

In an aspect, the decoder 120 or communication terminal can comprise a storage medium 122. As an example, the storage medium 122 can comprise a memory, buffer, storage device, or the like. As a further example, a number of content fragments can be loaded into the storage medium 122 and stored for playback or processing by the associated decoder 120. However, other data, content, and/or information can be stored in the storage medium 122 such as advertisements and alternative content, for example. In an aspect, the storage medium 122 can be separate from the decoder 120. For example, the storage medium 122 can be located upstream of the decoder 120 and downstream of the distribution system 116. As a further example, the storage medium 122 can store information to be transmitted to any number of decoders 120 or other recipient devices. Accordingly, the decoder 120 can retrieve the content fragments from the storage medium 122 for playback without having to communicate with the distribution system 116, thereby reducing latency in playback. In an aspect, the decoder 120 can process a data stream, which can comprise audio, video, or other data from the distribution system 116 with a regular cadence (e.g., every two seconds, four seconds, ten seconds, and the like). Other data and tracks can be received and processed by the user devices.

In an aspect, user location 119 is not fixed. By way of example, a user can receive content from the distribution system 116 on a mobile device such as a laptop computer, PDA, smartphone, GPS, vehicle entertainment system, and/or portable media player. The network of FIG. 1 is illustrative only and other types of networks and configurations may be used to implement the methods and systems provided.

In an aspect, a rights management device 124 or software can be in communication with one or more of the distribution system 116, decoder 120, a user device, and/or a network 126. In an aspect, the rights management device 124 can be configured to process user rights. As an example, the rights management device 124 can receive a request for access to content from the one or more devices or users. As a further example, the request can be denied or granted based upon the access rights associated with the one or more devices or users. In an aspect, one or more access tokens can be associated with user rights such as access rights for one or more devices, users, or households. As another example, the rights management device 124 can determine whether data is transmitted, presented, rendered, consumed, or the like, by a particular user or device based upon the access rights associated with the one or more access tokens. As another example, the one or more access tokens can be modified based upon granting or denying the request for data from one or more devices or users.

In an aspect, one or more access tokens can be associated with a data asset, a content asset, version or type of data asset, a user, a group of users, a device, a group of devices, a location, a class of user or device, a subscription, or the like. The one or more access tokens can relate to access rights, such as a right to download content, a right to present content, a right to stream content, a right to store content, a right to transmit, or a right to share content, or a combination thereof. Access rights can also comprise thresholds relating to a total number of currently active streams of the account (e.g. a limit of 5 active streams per account), a total number of currently enabled devices (e.g. a limit of 5 tokens allowing play per account, whether or not streams are active), or subscriptions (e.g. subscription must be current for asset to play), parental control settings for the account or device, or the like. Accordingly, when a particular user makes a request for particular content, the rights management device 124 can analyze the access token associated with the user and the requested content to determine if the user has rights to the requested content. In an aspect, granting the request for content can be dependent upon a location of the one or more devices, content type, access type, or time duration relating to content, or a combination thereof. In another aspect, the request for access can comprise a type of access, such as download, transmit, stream, present, or share, or a combination thereof.

As an example, a first access token can be associated with a first group of users. The first access token can also be associated with one or more data assets, such as content. The first access token can afford the first group of users a particular set of user rights such as access rights. As a further example, the set of user rights can comprise a right to download a particular data asset up to a certain number of times and a right to simultaneously stream the data asset to up to a certain number of devices. As such, when a member of the first group of users downloads the data asset, the first access token is modified to represent that a download has occurred. When the download threshold (e.g., three downloads) is met, the first access token download of the data asset can be restricted or denied. Similarly, if two members of the first group of users are streaming the data asset and a third member of the first group of users requests streaming of the data asset, the request can be denied for exceeding the threshold for streaming access allocated to the first access token.

Figure 2:
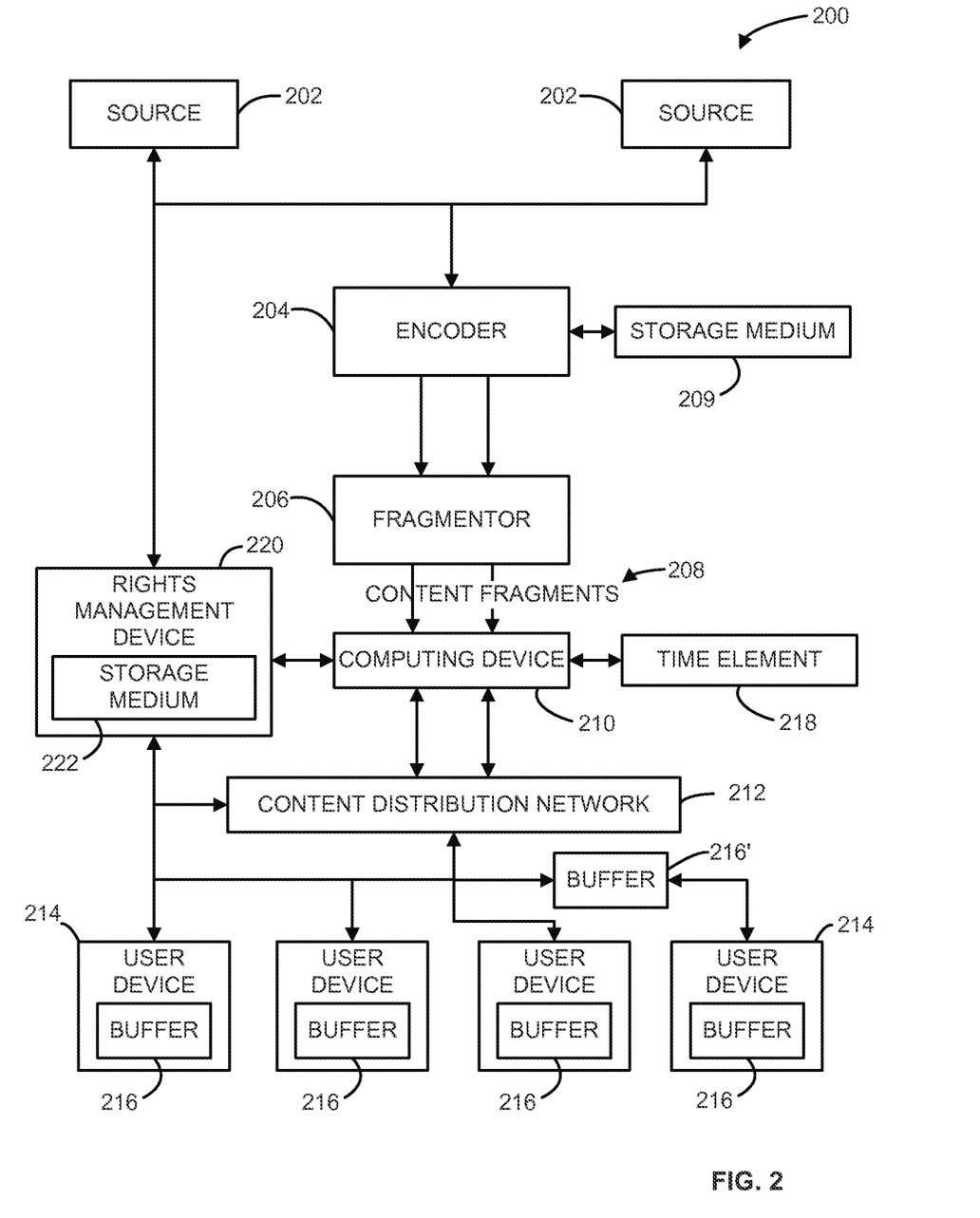
FIG. 2 is a block diagram of an example system architecture.

In an aspect, provided are methods and systems for managing data such as content accessed by one or more devices. In an aspect, one or more access tokens can be used to determine user rights for accessing the data. FIG. 2 is a block diagram of an example system 200. The system 200 can comprise one or more data sources 202 for accessing and/or transmitting data, such as a data stream. An encoder 204 can be in signal communication with the data source 202. A fragmentor 206 can be in signal communication with the encoder 204. As an example, the encoder 204 and the fragmentor 206 can be integrated as part of a unitary device. However, the encoder 204 and the fragmentor 206 can be separate and distinct components.

In an aspect, the data sources 202 can comprise a content provider for providing one or more of audio content, video content, news, sports programming, advertisements, and the like. As an example, the data sources 202 can be configured to transmit the data (e.g., as a data stream, fragments, files, etc.) to various end-users. In an aspect, one or more data sources 202 can comprise a content database having a plurality of content assets such as advertisements, video, audio, and the like, stored therein or capable of accessing content assets stored elsewhere.

As an example, one or more of the data sources 202 can comprise a network data feed transmitting the data stream to users such as subscribers or clients. As a further example, the one or more data sources 202 can be configured to transmit the data stream in a standard video format, such as, but not limited to, any of the Moving Picture Experts Group standards (e.g., MPEG-2, MPEG-4, a single MPEG-4 video encapsulated in an MPEG-2 transport stream over UDP MCAST, etc.), or any other standard for audio and/or video, such as MP3, Quicktime, and Audio Video Interleave (avi). However, the encoder 204 can be configured to receive the data stream from any source having any format that can be encoded (or transcoded) into a format that is appropriate for streaming or otherwise transmitting.

The encoder 204 can be any device, system, apparatus, or the like to encode and/or transcode the data stream. In an aspect, the encoder 204 converts a single (high) bit rate to an output of multiple (lower) bitrates. As an example, the encoder 204 can convert the data stream from the input format received from the data source (such as MPEG-2, QAM, etc.) to a transport format for distribution to consumers (such as MPEG-4). In an aspect, the encoder 204 can be a device such as a transcoder that conditions streaming data and/or changes it from one format to another. The encoder 204 can be configured to receive the data stream, or other type of signal, from one or more of the data sources 202 and encode/transcode information onto the data stream. In an aspect, the encoder 204 can add information to the signal. In an aspect, a buffer or storage medium 209 can be in communication with the encoder 204 or integrated therewith. As an example, data received by the encoder 204 can be buffered or stored in the storage medium 209.

In an aspect, the fragmentor 206 can be in signal communication with the encoder 204 to receive the data stream therefrom. As an example, the fragmentor 206 and the encoder 204 are configured as a unitary device. However, the fragmentor 206 and the encoder 204 can be integrated or separate. In an aspect, fragmentor 206 conditions the data stream (or other data signal) for downstream distribution by a computing device 210 through a content distribution network 212 to user devices 214 the decoder 120). In an aspect, the computing device 210 can be an origin Hypertext Transfer Protocol (HTTP) computing device. However, other computing devices can be used, such as a rate adaptive streaming server. As an example, the fragmentor 206 can communicate with the computing device 210 using the POST method of the HTTP. As a further example, the computing device 210 can implement the functions described relative to the encoder 204 and/or the fragmentor. However, other protocols, configurations, and communication methods can be used.

In an aspect, the fragmentor 206 can separate or fragment the data stream into each of the content fragments 208 represented by the data stream based upon information encoded in the data stream by the encoder 204. In another aspect, the fragmentor 206 accesses the information encoded/inserted in the data stream by the encoder 204 to define the content fragments 208 based on, among other things, boundaries, grouping, timing, or duration. Once the content fragments 208 are generated, the content fragments 208 can be transmitted to the content distribution network (CDN) 212 for delivery to the user devices 214 for consumption (e.g., playback). As an example, the computing device 210, CDN 212, and the user devices 214 can intercommunicate using the GET method of HTTP. However, other protocols and communication methods can be used.

In an aspect, one or more of the user devices 214 can comprise a buffer 216. As an example, the buffer 216 can comprise a memory or a storage device for temporary and/or persistent storage. As a further example, a number of the content fragments 208 can be loaded into the buffer 216 and stored for playback by the associated user device 214. Accordingly, the user device 214 can retrieve the content fragments 208 from the buffer 216 for playback without having to communicate with the CDN 212, thereby reducing data stream, which can comprise audio, video, or other data from the computing device 210 with a regular cadence (e.g., every two seconds, four seconds, ten seconds). Other data, content, and/or information can be stored in the buffer 216 such as advertisements and alternative content, for example.

In an aspect, a buffer 216' can be separate from the user device 214. For example, the buffer 216' can be located upstream of the user device 214 and downstream of the CDN 212. As a further example, the buffer 216' can store information to be transmitted to any number of user devices 214 or other recipient devices. Accordingly, the user device 214 can retrieve the content fragments 208 from the buffer 216' for playback without having to communicate with the CDN 212, thereby reducing latency in playback. In an aspect, the content fragments 208 can be retrieved from buffer 216 and 216' simultaneously or in various sequences.

In an aspect, a time element 218 can be in communication with one or more of the encoder 204, the fragmentor 206, and the computing device 210 to provide a timing reference thereto. As an example, the time element 218 can be a clock. As a further example, the time element 218 can transmit information to one or more of the encoder 204, the fragmentor 206, and the computing device 210 for associating a time stamp with a particular event received by one or more of the encoder 204, the fragmentor 206, and the computing device 210. In an aspect, one or more of the encoder 204, the fragmentor 206, and the computing device 210 can cooperate with the time element 218 to associate a time stamp with events having an effect on the content delivered to the user devices 214, such as, for example, content or data request, content or data download, a channel tune, a remote tune, remote control events, playpoint audits, playback events, program events including a program start time and/or end time and/or a commercial/intermission time, and/or playlist timing events, and the like. In an aspect, content having a particular time duration can comprise one or more data blocks, wherein each data block represents a portion of the overall time duration of the content.

In an aspect, a rights management device 220 (e.g., rights management device 124 (FIG. 1)) can be in communication with one or more of the user devices 214. In an aspect, the rights management device 220 can be in communication with one or more data sources 202, an origin server, computing device 210, and/or the content distribution network 212. As an example, the rights management device 220 can be configured to manage transmission of data, such as content transmitted to one or more of the user devices 214. As a further example, the rights management device 220 can log and/or analyze a time at which one or more of the user devices 214 request data such as content.

In an aspect, the rights management device 220 can determine whether particular data should be transmitted to one or more of the user devices 214. As an example, the content data can be routed through the CDN 212 or other networks. As a further example, the content data can be retrieved directly from one or more of the data sources 202 or from an origin computing device, such as the computing device 210. In an aspect, content data can be spliced into the content fragments 208 received at the user device 214 based upon an instruction from the rights management device 220. As an example, computing device 210 can be configured to operate, at least in part, as the rights management device 220.

In an aspect, the rights management device 220 can be configured to process user rights such as access rights. As an example, the rights management device 220 can receive a request for access to content from the one or more devices or users. As a further example, the request can be denied or granted based upon the access rights associated with the one or more devices or users. In an aspect, one or more access tokens can be associated with user rights for one or more devices, users, or households. As an example, information relating to the access tokens can be stored on a storage medium 222 and accessed by the rights management device 220. As another example, the rights management device 220 can determine whether data is transmitted, presented, rendered, consumed, or the like, by a particular user or device based upon the user rights associated with the one or more access tokens. As another example, the one or more access tokens can be modified based upon granting or denying the request for data from one or more devices or users.

In an aspect, one or more access tokens can be associated with a data asset, a content asset, a user, a group of users, a device, a group of devices, a location, a subscription, or the like. The one or more access tokens can relate to access rights, such as a right to download content, a right to present content, a right to stream content, a right to store content, a right to transmit, or a right to share content, or a combination thereof. Accordingly, when a particular user makes a request for particular content, the rights management device 220 can analyze the access token associated with the user and the requested content to determine if the user has rights to the requested content. In an aspect, granting the request for content can be dependent upon a location of the one or more devices, content type, access type, or time duration relating to content, or a combination thereof. In another aspect, the request for access can comprise a type of access such as download, transmit, stream, present, or share, or a combination thereof.

As an example, a first access token can be associated with a first group of users. The first access token can also be associated with one or more data assets, such as content. The first access token can afford the first group of users a particular set of user rights relating to a particular data asset. As a further example, the set of user rights can comprise a right to download a particular data asset up to a certain number of times and a right to simultaneously stream the data asset to up to a certain number of devices. As such, when a member of the first group of users downloads the data asset, the first access token is modified to represent that a download has occurred. When the download threshold (e.g., three downloads) is met, the download of the data asset can be restricted or denied. Similarly, if two members of the first group of users are streaming the data asset and a third member of the first group of users requests streaming of the data asset, the request can be denied for exceed the threshold for streaming access allocated to the first access token.

In an aspect, provided are methods and systems for managing data, such as content, transmitted to one or more devices. In an aspect, one or more devices can request one or more data assets from a content source, origin server, streaming server, rate adaptive server, or the like.

Figure 3:
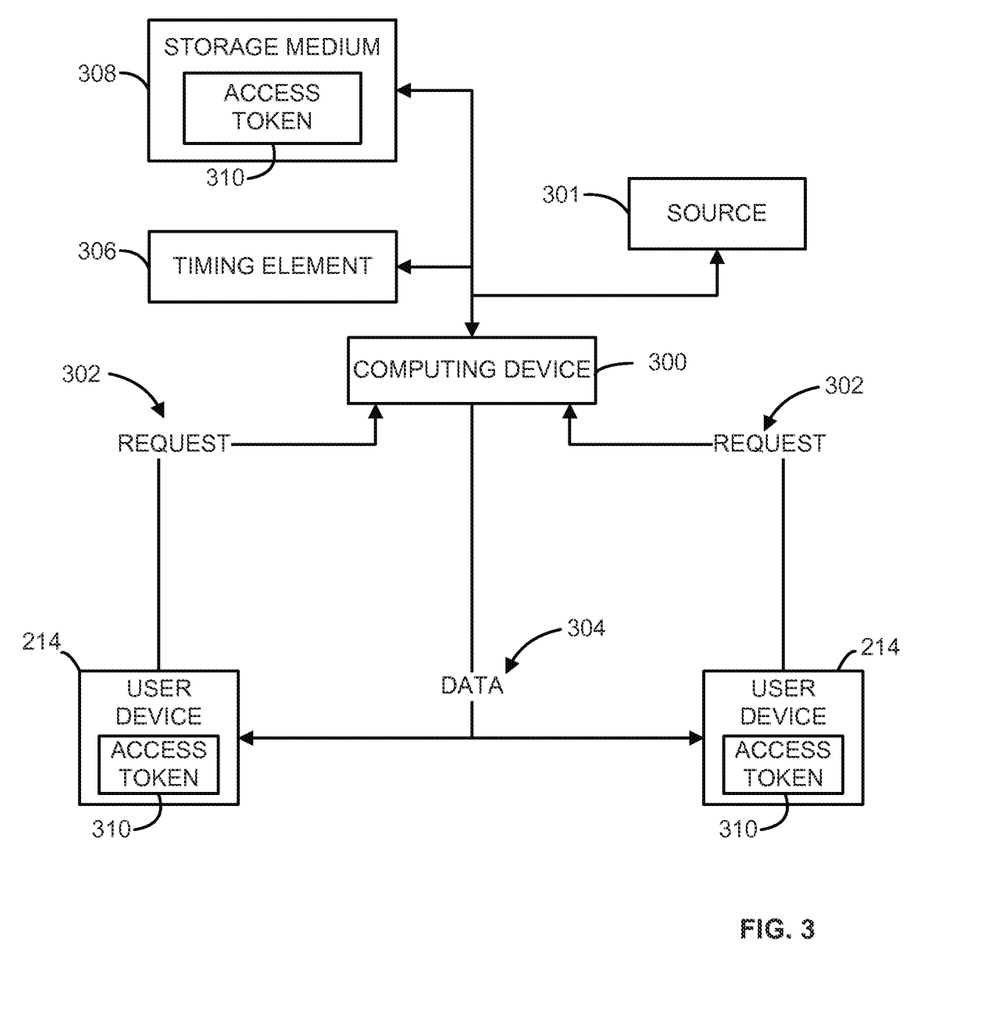
FIG. 3 is a block diagram of an example system architecture.

FIG. 3 is a block diagram of an example system. In an aspect, a computing device 300 (e.g., origin server, streaming server, rights management device 124 (FIG. 1), rights management device 220 (FIG. 2), etc.) can be in communication with one or more of the user devices 214. In an aspect, the computing device 300 can be in communication with one or more data sources 301 and/or content providers. As an example, the computing device 300 can be an asset management device for controlling data assets accessed by one or more of the user devices 214. In an aspect, the computing device 300 can log and/or analyze one or more content requests 302 received from one or more of the user devices 214 or other devices.

In an aspect, one or more access tokens can be associated with a data asset, a content asset, a user, a group of users, a device, a group of devices, a location, a subscription, or the like. The one or more access tokens can relate to access rights such as a right to download content, a right to present content, a right to stream content, a right to store content, a right to transmit, or a right to share content, or a combination thereof. Accordingly, when a particular user makes a request for a particular content, the computing device 300 can analyze the access token associated with the user and the requested content to determine if the user has rights to the requested content. In an aspect, access rights can comprise user or device rights relating to any interaction with data, such as content. Interactions can comprise download, transmission, upload, sharing, rendering, modifying, copying, storing, and the like. Access rights can be provided based on particular content assets, types of content assets, type of access, geo-location of user or device, class of user or device, and other criteria. In another aspect, granting the request for content can be dependent upon a location of the one or more devices, content type, access type, user/device characteristic (e.g., class of user/device, age of user/device), or time duration relating to content, or a combination thereof. In another aspect, the request for access can comprise a type of access, such as download, transmit, stream, present, or share, or a combination thereof.

As an example, a second access token can be associated with a second group of devices or user and a particular data asset. The second access token can be associated with one or more data assets such as content. As a further example, the set of user rights can comprise a right to download a particular data asset up to a certain number of times and a right to simultaneously stream the data asset to up to a certain number of devices. As such, when a member of the second group of users downloads the particular data asset, the second access token is modified to represent that a download has occurred. When the download threshold (e.g., three downloads) is met, the download of the data asset can be restricted or denied. Similarly, if two members of the second group of devices are streaming the particular data asset and a third member of the second group of devices requests streaming of the data asset, the request can be denied for exceeding the threshold for streaming access allocated to the second access token. One or more access tokens can be associated with an expiration or time to live. As an example, the one or more access tokens may only grant rights for a pre-defined period of time (e.g., one hour, one day, one week, twelve months, etc.). Any time period can be used. Time periods associated with particular access tokens can be customized for specific users, devices, subscriptions content assets, or other criteria.

Figure 4:
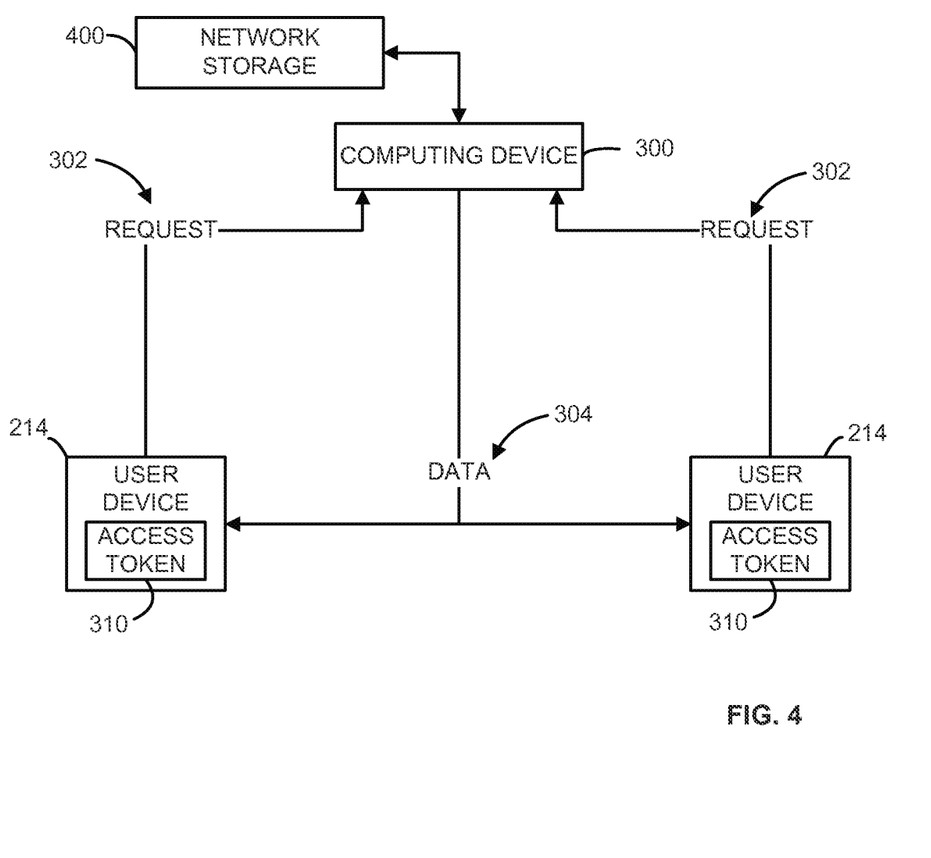
FIG. 4 is a block diagram of an example system architecture.

FIG. 4 is a block diagram of an example system. In an aspect, the computing device 300 can be in communication with one or more network storage devices 400. In another aspect, the computing device 300 can be configured to manage the data assets such as content that are accessed by one or more users or devices. In another aspect, the computing device 300 can be configured to copy a stored data asset (e.g., an h-264 recording) from the network storage device 400. Accordingly, the copied data asset can be consumed in any location via the requesting device. As an example, pre-defined limits can be used govern the number of stored data assets that can be copied, downloaded, transferred, and/or shared and/or the time period within which the data assets can be consumed. As a further example, a particular user or device can download up to 10 individual recordings and store the recordings for 30 days. Other limits and/or rules can be used to manage data access.

In an aspect, one or more users can "check out" a data asset and download the data asset or a copy of the data asset to a device associated with a user. Accordingly, the one or more users can consume the data asset in any location. As an example, one or more users can securely register a configurable number of devices to a user account. As a further example, the registered devices can be manually or automatically registered/deregistered.

In an aspect, user accounts can be configured to limit the number of data assets that can be accessed under the respective user account. For example, a first user account can check out and download a configurable number of content recordings at a time to a registered device. If a request for download of a data asset exceeds the allowed number for the account, the request can be denied.

In an aspect, one or more data asserts can be downloaded to one or more devices for local consumption. As an example, if an access right associated with a data asset is checked out by a user or device, any other requests for the same access a particular user account can be temporary denied until the data asset is checked in. In an aspect, one or more access rights can be associated with a particular content asset. As an example, a record or list of access rights can be maintained comprising the check-in/check-out state of the one or more access rights associated with the content asset. The check-in/check-out state can comprise a bit state or be represented by a variable, token, bit string, or the like. In a further aspect, access rights can be managed without tracking the actual content asset to which the access rights relate. For example, a content asset can be encrypted and transmitted to any number of devices. As a further example, only devices that have the appropriate access rights to check-out can decrypt the content asset for use. In yet another aspect, a configurable expiration time can be assigned to one or more data assets upon access. Accordingly, the receiving user or device may have a limited time period to access the data asset before further access is denied.

Figure 5:
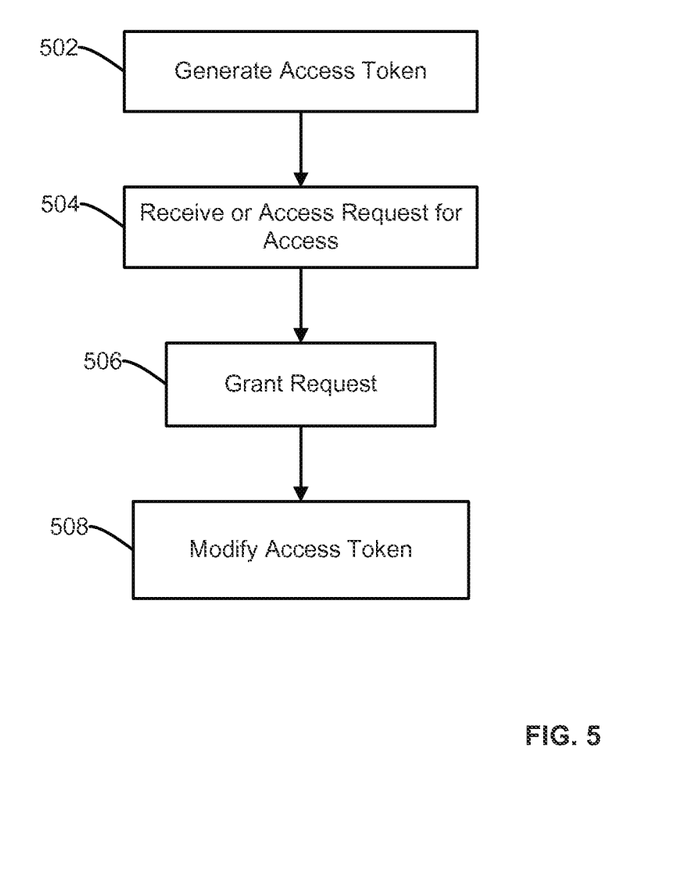
FIG. 5 is a flow chart of an example method.

FIG. 5 illustrates an example method. In step 502, an access token can be generated (e.g., created, loaded, retrieved, etc.). In an aspect, the access token can be a data tuple, record, object, bit string and the like. The access token can comprise one or more fields for organizing/classifying information such as an identifier, related content asset, related rights, check-in/check-out status of related rights, expiration, user/device associated with the access token, and/or other information fields. In another aspect, the access token can represent access rights associated with one or more users, devices, and data assets. As an example, the access token can be associated with a particular data asset or assets. As a further example, the access rights can comprise a right to download content, a right to present content, a right to stream content, a right to store content, a right to transmit, or a right to share content, or a combination thereof.

In another aspect, an access token can be generated and associated with a group of users. The access token can afford the group of users a particular set of access rights relating to a particular data asset. As a further example, the set of access rights can comprise aright to download a particular data asset up to a certain number of times and a right to simultaneously stream the data asset to up to a certain number of devices.

In step 504, a request for access to data can be received. In an aspect, the request can be received from the one or more users or devices. As an example, the request can relate to a particular data asset. As another example, the request for access can comprise a type of access, such as download, transmit, stream, present, or share, or a combination thereof.

In step 506, the request can be granted or denied. In an aspect, a decision of granting the request can be based upon the access rights of the one or more users or devices. As an example, granting the request can be dependent upon a location of the one or more users, content type, access type, or time duration relating to content, or a combination thereof. As a further example, granting the request can comprise facilitating access to the content.

In step 508, the access token can be modified based upon granting or denying the request. In an aspect, modifying the access token can comprise modifying the access rights represented by the access token. In another aspect, modifying the access token can be dependent upon a location of the one or more users, content type, access type, delivery type, or time duration relating to content, or a combination thereof. As an example, modifying the access token can be based upon limits/thresholds applied across various networks or delivery type, as QAM, wireless, or the like. In another aspect, when a member of a group of users associated with a particular access token downloads a data asset, the access token can be modified to represent that a download has occurred. When the download threshold (e.g., three downloads) is met, the download of the data asset can be restricted or denied. Similarly, if two members of the group of users are streaming the data asset and a third member of the group of users requests streaming of the data asset, the request can be denied for exceeding the threshold for streaming access allocated to the access token. Other access rights and policies can be implemented via the access token.

Figure 6:
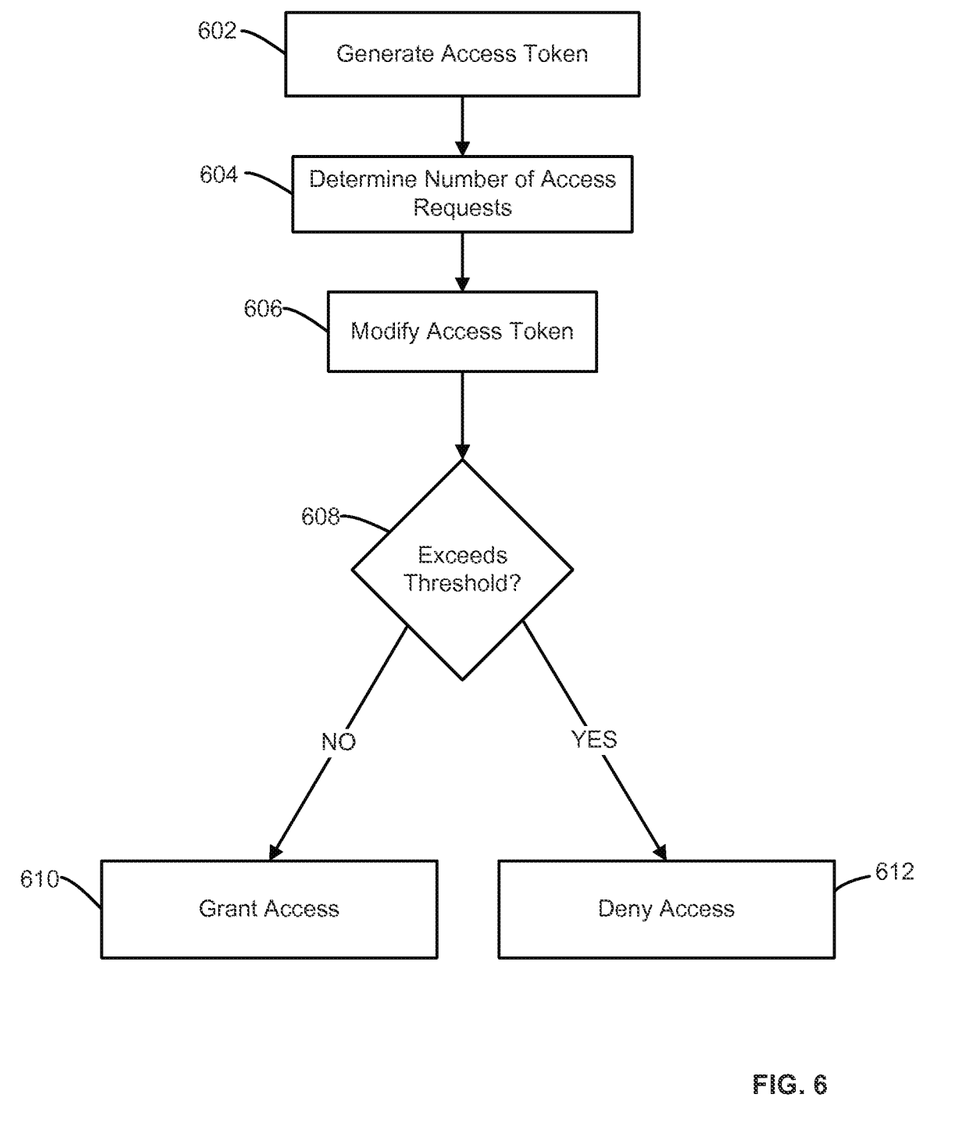
FIG. 6 is a flow chart of an example method.

FIG. 6 illustrates an example method. In step 602, an access token can be generated (e.g., created, loaded, retrieved, etc.). In an aspect, the access token can be a data tuple, record, object, bit string and the like. The access token can comprise one or more fields for organizing/classifying information such as an identifier, related content asset, related rights, check-in/check-out status of related rights, expiration, user/device associated with the access token, and/or other information fields. In another aspect, the access token can represent access rights associated with one or more users, devices, and data assets. As an example, the access token can be associated with a particular data asset or assets. As a further example, the access rights can comprise aright to download content, aright to present content, a right to stream content, a right to store content, a right to transmit, or a right to share content, or a combination thereof.

In step 604, a number of access requests granted and/or denied can be determined. In an aspect, a number of access requests granted for a particular data asset, user, and/or device can be determined. As an example, a device or software that interfaces with a content asset can track the user interactions with the content asset. As a further example, as the user checks-out an asset right associated with playback of a content asset, the device used to playback the asset right can provide tracking information, such as playback status, pause status, rewind, number of times the asset is accessed, length of time the asset is accessed, and the like. Such information can be tracked and provided by other mechanisms. As such, the tracked information can be used to update the access token associated with the particular content asset and/or user.

In step 606, the access token can be modified based upon the number of access requests granted and/or denied. In an aspect, modifying the access token can comprise modifying the access rights represented by the access token. In another aspect, modifying the access token can be dependent upon a location of the one or more users, content type, access type, or time duration relating to content, or a combination thereof.

In step 608, the number of access requested received, granted, and/or denied can be compared to a pre-defined comparator or threshold. In an aspect, the number of access requested determined in step 604 can be compared to an access threshold. As an example, the access threshold can be dependent upon a location of the one or more users, content type, access type, or time duration relating to content, or a combination thereof.

In step 610, if the number of access requests does not exceed an access threshold or the threshold exceeds the number of access requests, one or more subsequent access requests can be granted. The access threshold can be pre-defined or dynamic. The access threshold can be based upon a related content asset or user, wherein different content assets, users, or receiving devices can have different access thresholds associated therewith. In an aspect, the type of access request can have a variable weight associated therewith. For example, a request for streaming standard definition video can be weighted as a single request, while a request for streaming high definition video can be weighted as two requests. Various weighting techniques and values can be based upon types of content, duration of content, type of access requested, time of day, location of receiving device, type of receiving device, class of user, subscription package, and other criteria.

In step 612, if the number of access requests exceeds an access threshold, one or more subsequent access requests can be denied. Once access rights are checked-in and made available, the number of access requests can be decremented to allow further requests to be granted. In another aspect, when a member of a group of users associated with a particular access token downloads a data asset, the access token can be modified to represent that a download has occurred. When the download threshold (e.g., three downloads) is met, the download of the data asset can be restricted or denied. Similarly, if two members of the group of users are streaming the data asset and a third member of the group of users requests streaming of the data asset, the request can be denied for exceeding the threshold for streaming access allocated to the access token. Other access rights and policies can be implemented via the access token.

Figure 7:
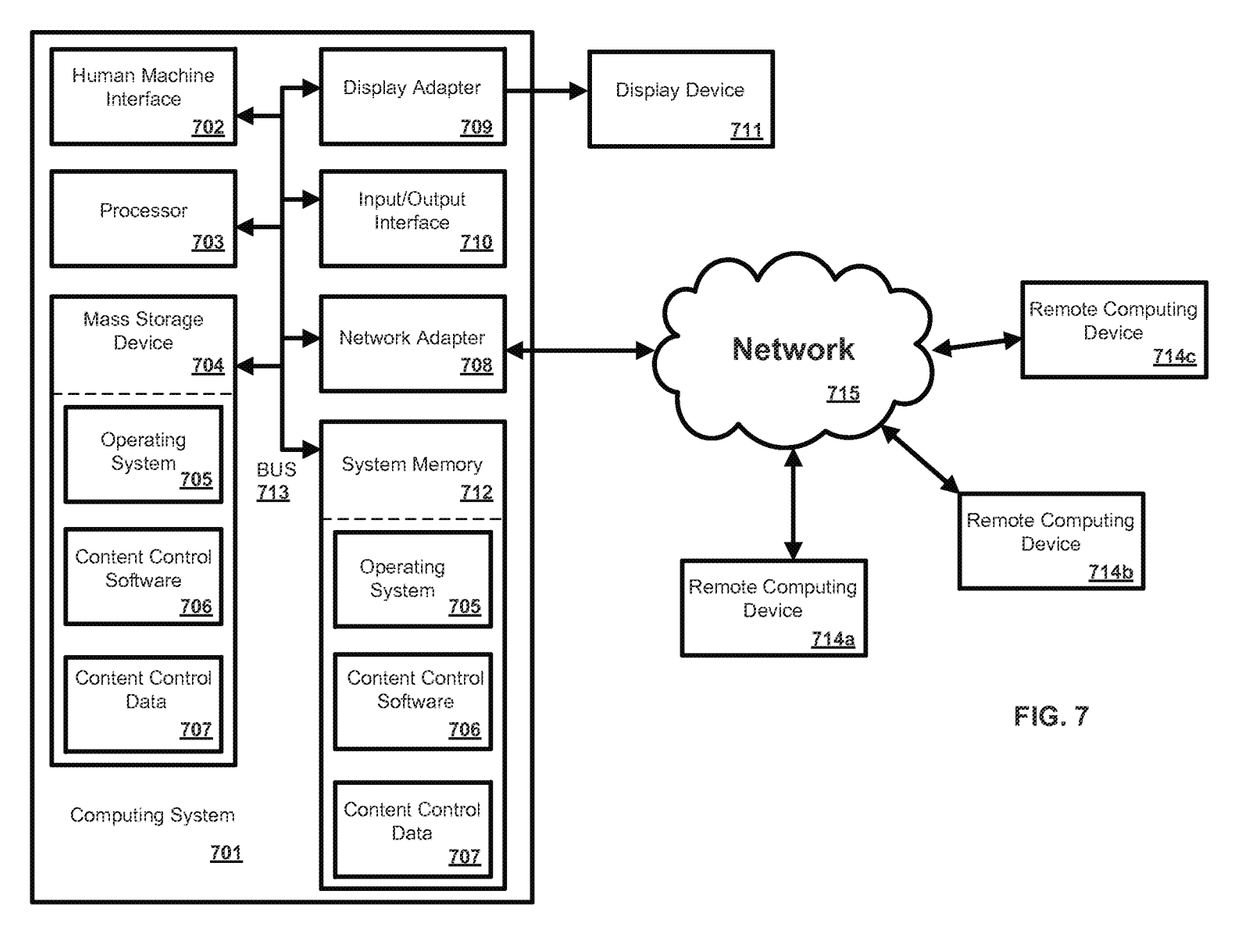
FIG. 7 is a block diagram of an example computing system.

In an example aspect, the methods and systems can be implemented on a computing system 701 as illustrated in FIG. 7 and described below. By way of example, computing device 210, the user device 214, the decision computing device 220 of FIG. 2, and/or the computing device 300 of FIG. 3 can be a computing system as illustrated in FIG. 7.

FIG. 7 is a block diagram illustrating an example operating environment for performing the disclosed methods. One skilled in the art will appreciate that provided herein is a functional description and that the respective functions can be performed by software, hardware, or a combination of software and hardware. This example operating environment is only an example of an operating environment and is not intended to suggest any limitation as to the scope of use or functionality of operating environment architecture. Neither should the operating environment be interpreted as having any dependency or requirement relating to any one or combination of components illustrated in the example operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, and/or distributed computing environments that comprise any of the above systems or devices.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computing system 701. The components of the computing system 701 can comprise, but are not limited to, one or more processors or processing units 703, a system memory 712, and a system bus 713 that couples various system components including the processor 703 to the system memory 712. In the case of multiple processing units 703, the system can utilize parallel computing.

The system bus 713 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 713, and all buses specified in this description can also be implemented over a wired or wireless network connection and each of the subsystems, including the processor 703, a mass storage device 704, an operating system 705, content control software 706, content control data 707, a network adapter 708, system memory 712, an Input/Output Interface 710, a display adapter 709, a display device 711, and a human machine interface 702, can be contained within one or more remote computing devices 714*a,b,c* at physically separate locations, connected through buses of this form, in effect implementing a fully distributed system.

The computing system 701 typically comprises a variety of computer readable media. Example readable media can be any available media that is accessible by the computing system 701 and comprises, for example and not meant to be limiting, both volatile and non-volatile media, removable and non-removable media. The system memory 712 comprises computer readable media in the form of volatile memory, such as random access memory (RAM), and/or non-volatile memory, such as read only memory (ROM). The system memory 712 typically contains data such as content control data 707 and/or program modules such as operating system 705 and content control software 706 that are immediately accessible to and/or are presently operated on by the processing unit 703.

In another aspect, the computing system 701 can also comprise other removable/non-removable, volatile/non-volatile computer storage media. By way of example, FIG. 7 illustrates a mass storage device 704 which can provide non-volatile storage of computer code, computer readable instructions, data structures, program modules, and other data for the computing system 701. For example and not meant to be limiting, a mass storage device 704 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 704, including by way of example, an operating system 705 and content control software 706. Each of the operating system 705 and content control software 706 (or some combination thereof) can comprise elements of the programming and the content control software 706. Content control data 707 can also be stored on the mass storage device 704. Content control data 707 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems. In an aspect, content control data 707 can comprise information relating to events, event notifiers, placement spots, alternate programming, programming blackout, advertisements, and the like. As an example, the content control data can comprise information relating to a particular programming being transmitted to a user location. As a further example, the content control data can comprise information and instructions related to processing placement signals and updating content being transmitted to a user location. However, other information can be associated with the content control data, such as information about the subscriber consuming the content including location, device type, and subscription information, and information relating the content for blackouts including blackout locations and alternative content associated with the blackout.

In another aspect, the user can enter commands and information into the computing system 701 via an input device (not shown). Examples of such input devices comprise, but are not limited to, a keyboard, pointing device (e.g., a "mouse"), a microphone, a joystick, touch screen, a scanner, tactile input devices such as gloves, and other body coverings, and the like. These and other input devices can be connected to the processing unit 703 via, a human machine interface 702 that is coupled to the system bus 713, but can be connected by other interface and bus structures, such as a parallel port, game port, an IEEE 1394 Port (also known as a Firewire port), a serial port, or a Universal Serial Bus (USB).

In yet another aspect, a display device 711 can also be connected to the system bus 713 via an interface, such as a display adapter 709. It is contemplated that the computing system 701 can have more than one display adapter 709 and the computing system 701 can have more than one display device 711. For example, a display device can be a monitor, an LCD (Liquid Crystal Display), or a projector. In addition to the display device 711, other output peripheral devices can comprise components such as speakers (not shown) and a printer (not shown) which can be connected to the computing system 701 via Input/Output Interface 710. Any step and/or result of the methods can be output in any form to an output device. Such output can be any form of visual representation, including, but not limited to, textual, graphical, animation, audio, tactile, and the like. The display 711 and computing system 701 can be part of one device, or separate devices.

The computing system 701 can operate in a networked environment using logical connections to one or more remote computing devices 714*a,b,c*. By way of example, a remote computing device can be a personal computer, portable computer, smartphone, a server, a router, a network computer, a peer device or other common network node, and so on. Logical connections between the computing system 701 and a remote computing device 714*a,b,c* can be made via a network 715, such as a local area network (LAN) and/or a general wide area network (WAN). Such network connections can be through a network adapter 708. A network adapter 708 can be implemented in both wired and wireless environments. Such networking environments are conventional and commonplace in dwellings, offices, enterprise-wide computer networks, intranets, and the Internet.

For purposes of illustration, application programs and other executable program components such as the operating system 705 are illustrated herein as discrete blocks, although it is recognized that such programs and components reside at various times in different storage components of the computing system 701, and are executed by the data processor(s) of the computer. An implementation of content control software 706 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and communications media. "Computer storage media" comprise volatile and non-volatile, removable and non-removable media implemented in any methods or technology for storage of information such as computer readable instructions, data structures, program modules, or other data. Example computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
   receiving a request for access to a data asset, wherein the request indicates a requested quality level of the data asset;
   weighting, based on the requested quality level of the data asset, a request count associated with the request for access, wherein a lower requested quality level is associated with a lower weighted request count relative to a higher requested quality level being associated with a higher weighted request count;
   determining, based on an access token associated with the data asset and the weighted request count, a number of requests for access to the data asset that are associated with a user device, wherein the weighted request count is included in the number of requests; and
   granting, based on the number of requests for the data asset that are associated with the user device being less than a number of requests for access to the data asset permitted to the user device, the request for access.

2. The method of claim 1, further comprising generating the access token, wherein the access token indicates one or more access rights of the user device and wherein the one or more access rights comprise one or more of a right to download data, a right to present data, a right to stream data, a right to store data, a right to transmit data, or a right to share data.

3. The method of claim 1, wherein the request for access comprises a request for a type of access.

4. The method of claim 3, wherein the type of access comprises one or more of access to download the data asset, transmit the data asset, copy the data asset, stream the data asset, present the data asset, or share the data asset.

5. The method of claim 1, wherein granting the request comprises facilitating interaction with the data asset.

6. The method of claim 1, further comprising modifying, based on granting the request for access, the access token, wherein modifying the access token comprises modifying a check-in/check-out state associated with one or more access rights.

7. The method of claim 1, further comprising modifying, based on granting the request for access and one or more of a location of the user device, a data type, an access type, a delivery type, or a time duration relating to data, the access token.

8. The method of claim 1, further comprising modifying the access token comprising modifying one or more access rights of the user device.

9. A method comprising:
   determining, based on an access token and a time a request for access to a data asset is received, a number of access requests for access to the data asset that are associated with one or more devices;

receiving, from the one or more devices, another request for access to the data asset, wherein the another request for access indicates a requested quality level of the data asset;

weighting, based on the requested quality level of the data asset, a request count associated with the another request for access, wherein a lower requested quality level is associated with a lower weighted request count relative to a higher requested quality level being associated with a higher weighted request count;

determining, based on the weighted request count and the number of access requests, an updated number of access requests; and granting, based on the updated number of access requests for access to the data asset being less than a number of requests for access to the data asset permitted to the one or more devices, the another request.

10. The method of claim 9, wherein the access token indicates access rights associated with the data asset and wherein the access rights comprise one or more of a right to download data, a right to present data, a right to stream data, a right to store data, a right to transmit data, or a right to share data.

11. The method of claim 9, wherein granting the another request is further based on one or more of a location of the one or more devices, a data type, an access type, or a time duration relating to data.

12. The method of claim 9, wherein one or more of the request for access or the another request for access comprises a type of access.

13. The method of claim 12, wherein the type of access comprises one or more of access to download the data asset, transmit the data asset, stream the data asset, present the data asset, or share the data asset.

14. The method of claim 9, wherein granting the request comprises facilitating access to the data asset.

15. The method of claim 9, further comprising modifying the access token, wherein modifying the access token comprises modifying a check-in/check-out state associated with one or more access rights indicated by the access token.

16. The method of claim 9, further comprising modifying, based on granting the another request for access and one or more of a location of a user device, a data type, an access type, a delivery type, or a time duration relating to data, the access token.

17. A method comprising:
determining a number of access requests for a data asset granted to a plurality of user devices;

modifying, based on the number of access requests granted to the plurality of user devices being less than a number of access requests for the data asset permitted to the plurality of user devices, an access token;

receiving a request for access to the data asset, wherein the request for access indicates a requested quality level of the data asset;

weighting, based on the requested quality level of the data asset, a request count associated with the request for access, wherein a lower requested quality level is associated with a lower weighted request count relative to a higher requested quality level being associated with a higher weighted request count; and denying, based on the weighted request count and one or more subsequent requests for access to the data asset from the plurality of user devices being more than a number of requests for access to the data asset permitted to the plurality of user devices, the one or more subsequent requests for access.

18. The method of claim 17, wherein the access token indicates access rights of the plurality of user devices and wherein the access rights comprise one or more of a right to download data, a right to present data, a right to stream data, a right to store data, a right to transmit data, or a right to share data.

19. The method of claim 17, wherein modifying the access token comprises modifying access rights indicated by the access token.

20. The method of claim 17, wherein modifying the access token comprises modifying access rights of the plurality of user devices.

* * * * *